UNITED STATES PATENT OFFICE.

ROBERT M. LAFFERTY, OF THREE RIVERS, MICHIGAN, ASSIGNOR TO HIMSELF AND J. E. & J. P. PRUTZMAN, OF SAME PLACE.

IMPROVEMENT IN PREPARING COTTON-SEED FOR PLANTING.

Specification forming part of Letters Patent No. 79,765, dated July 7, 1868.

*To all whom it may concern:*

Be it known that I, ROBERT M. LAFFERTY, of Three Rivers, in the county of St. Joseph and State of Michigan, have invented a new and useful Improvement in a Method of Preparing Cotton-Seed for Planting; and I do declare that the following is a true and accurate description thereof, reference being had to the accompanying drawings, and to the letters of reference marked thereon, and being a part of this specification.

The nature of this invention consists in rapidly removing the fuzz from cotton-seed to prevent it sticking together, and, if required, to coat it with any proper material, to render it easily planted by almost all of the ordinary seed-planters now in use.

I am aware that many attempts have been made to perfect apparatus for planting this seed; but I am not aware that any method has ever been perfected to remove the fuzz from the seed, which is the cause of all the difficulty in planting it.

To accomplish the desired object, I produce an instantaneous combustion of the fuzz by sprinkling sufficient gunpowder or other similar explosive preparation among the cotton-seed confined in any suitable vessel. Then, touching fire to the powder, it is ignited and instantaneously consumed, burning with it the furze from the seed. Care must, however, be taken not to use too much powder, as too fierce combustion will destroy the vitality of the seed, which will not be affected if only just enough powder is used to destroy the fuzz. Circumstances vary somewhat the amount of powder to be used. The condition of the seed, the amount cleaned with each trial, and the form of vessel used all have great influence in determining the quantity of powder required. In the trials I have made and with the vessel I have used I have used from two to four ounces per bushel of seed. If the seed is somewhat damp, a little more would be required, as would be the case in a wide-mouthed vessel.

After the fuzz or fiber has been removed, as hereinbefore described, the seed may be passed through a solution made by dissolving any glutinous matter in water, and then rolled in ground gypsum or other suitable substance, which will form a coating upon the seed, render it heavier and thereby more easily planted, and at the same be a fertilizer to assist in the germination of the seed when planted.

What I claim as my invention, and desire to secure by Letters Patent, is—

The method of cleaning and preparing cotton-seed for planting, substantially as hereinbefore described.

R. M. LAFFERTY.

Witnesses:
 H. S. SPRAGUE,
 J. W. HOUGHTELIN.